Jan. 6, 1959

J. ARVAY 2,867,204

STONE FACERS

Filed May 1, 1958

INVENTOR
JOSEPH ARVAY

BY

Frederick C. Browley

ATTORNEY

Jan. 6, 1959 J. ARVAY 2,867,204
STONE FACERS
Filed May 1, 1958 3 Sheets-Sheet 2
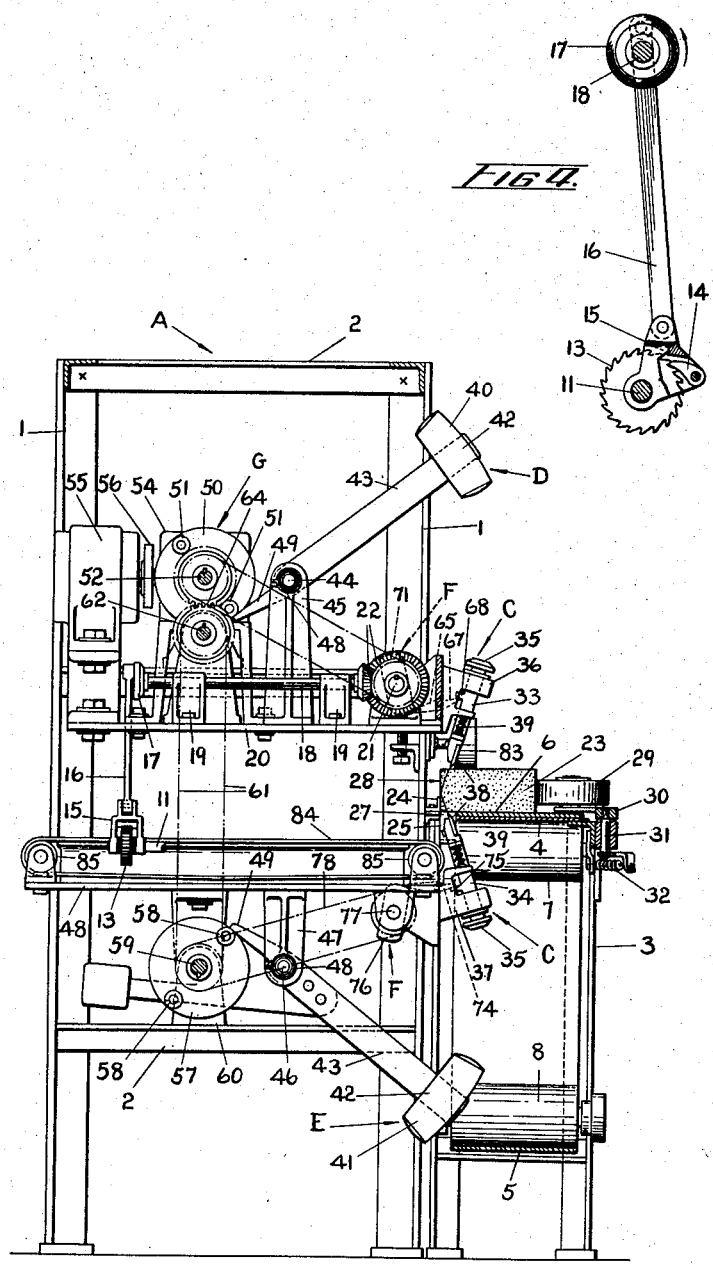
INVENTOR
JOSEPH ARVAY
By
Frederick E. Bromley
ATTORNEY Jan. 6, 1959     J. ARVAY     2,867,204
STONE FACERS
Filed May 1, 1958     3 Sheets-Sheet 3
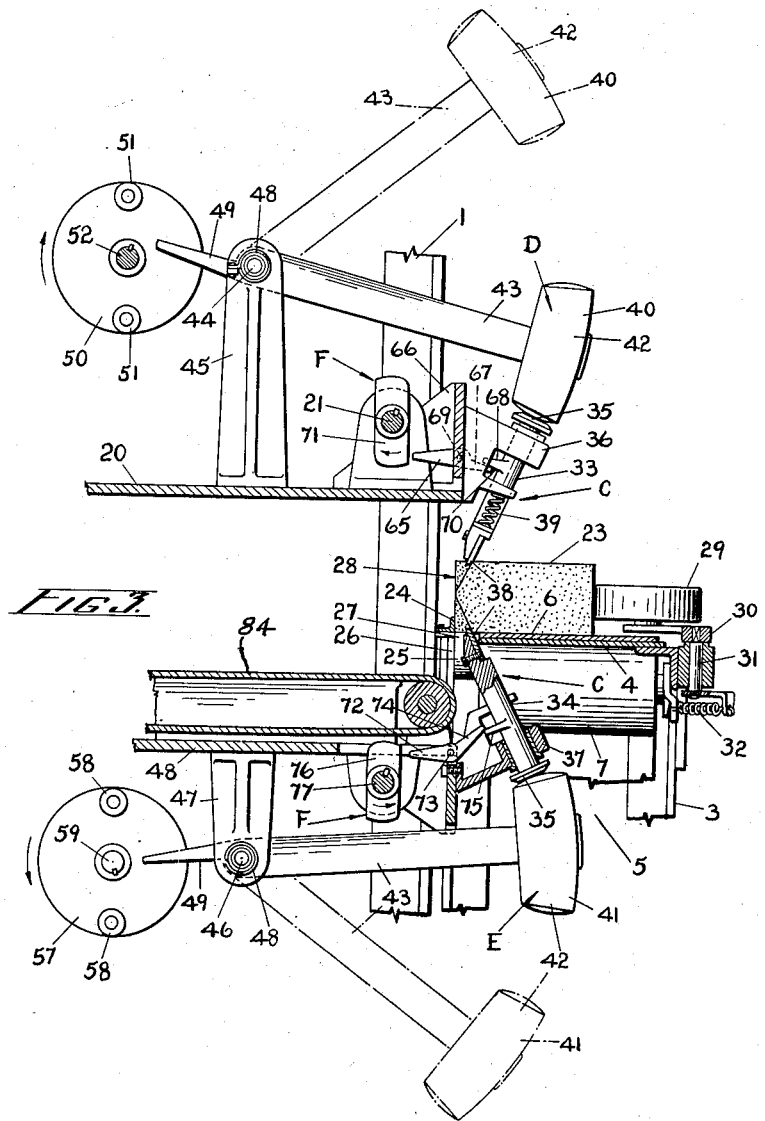
INVENTOR
JOSEPH ARVAY
BY
ATTORNEY

United States Patent Office 2,867,204
Patented Jan. 6, 1959

2,867,204

STONE FACERS

Joseph Arvay, Oshawa, Ontario, Canada

Application May 1, 1958, Serial No. 732,227

19 Claims. (Cl. 125—6)

My invention relates to improvements in machines for facing stones, by means of a chipping operation. The customary facing or dressing of an exposed face of a stone is a laborious operation when performed by hand, but, may be carried out expeditiously by a machine embodying chisels acted on by mechanically motivated hammers while the stones are subjected to a feeding operation.

The primary object of my invention is to produce a highly efficient and serviceable machine for facing stones of the kind commonly employed in building construction, etc.

A further and important object of my invention is to provide a facing machine of this kind which requires a minimum handling of the stones, and which produces a highly desirable chipped face of a general uniform character whereby the stone is given an attractive face which closely simulates hand chipping.

A still further object of my invention is to provide a machine of the kind referred to in which the chipping process is carried out automatically as the stones are moved by a conveyor to a chipping station where chisels are brought into operation to act on a face of the stones. A feature of the construction is that it provides for movement of the conveyor medium, with a step-by-step motion, so that the stones are held stationary while being acted on by the chisels and are then moved for a subsequent chipping operation and so on, until the entire face of the stone has been chipped. Another feature of the construction, is that the chisels are reciprocally supported in holders at suitable angles for chipping opposite edge faces of stones, and hammers are provided for striking the chisels with uniform blows. A still further feature is that lifters operate to raise the chisels after a chipping stroke in timed sequence. A chip disposal belt serves to carry away the chips so that the chips cannot accumulate and interfere with the effective operation of the machine.

Having related the primary objects of my invention, subsidiary objects and advantages will be apparent from the ensuing specification and the accompanying drawings, forming a part thereof, wherein a selected embodiment of the invention is disclosed.

In the drawings:

Fig. 2 is a cross-sectional view of the machine, showing a stone positioned for a facing operation;

Fig. 3 is a fragmentary cross-sectional view on an enlarged scale, showing more particularly the conveyor unit and the chisels together with the hammers and lift mechanism; and Fig. 4 is a detail of the ratchet drive for the conveyor belt.

Figure 1:
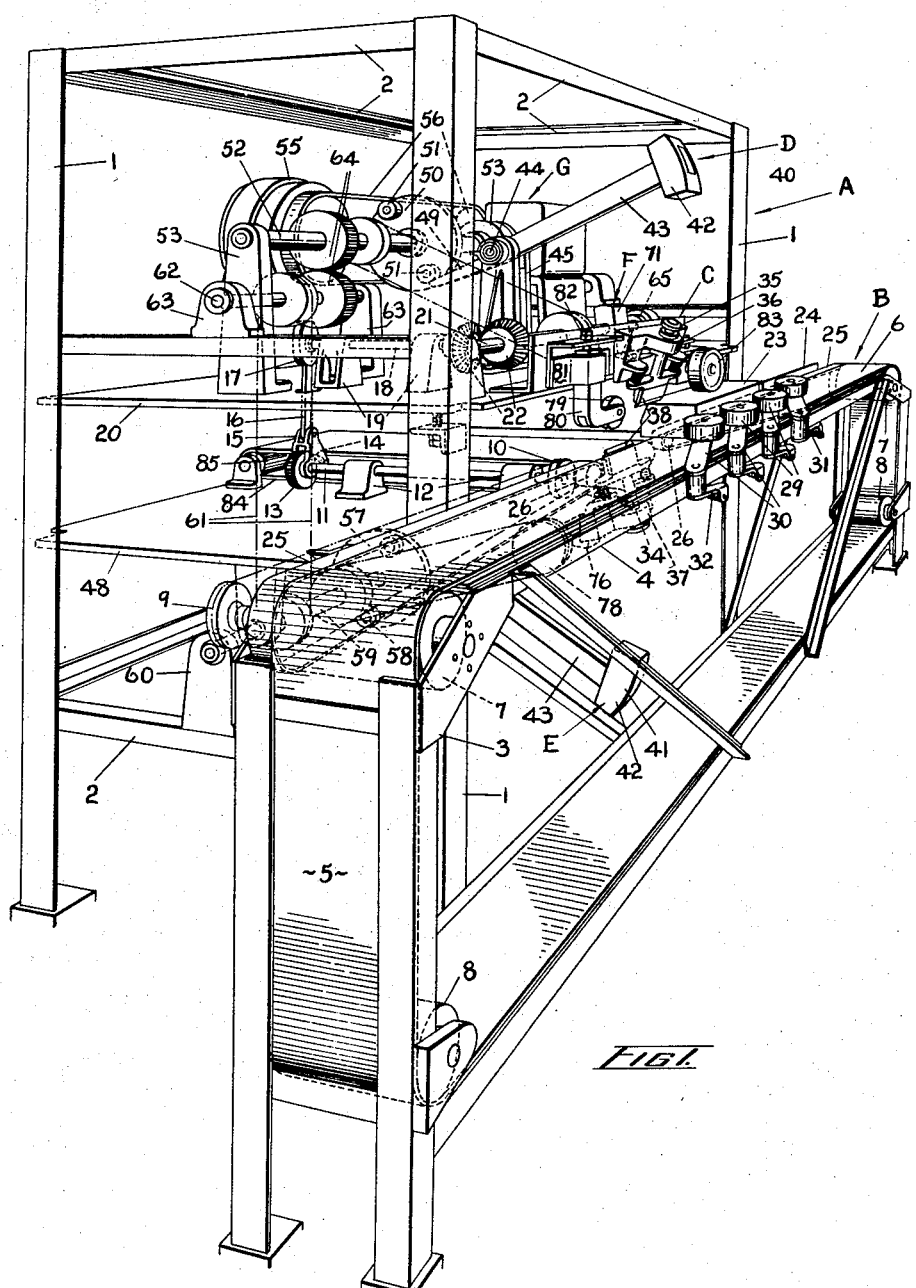
Fig. 1 is a general perspective view of the machine viewed largely from its frontal side to show the conveyor on which the stones are transported.

The machine of my invention comprises a suitable frame generally indicated at A; a conveyor unit for stones denoted as a whole by the character B; chisel devices as at C; upper and lower hammer mechanisms D and E respectively and co-operating lifter mechanism F; and a power transmission unit generally denoted at G.

The frame A is of an approved construction and embodies upright members 1, and connected horizontal members such as those indicated at 2; and in addition, any desirable brace members or gussets well known in the art.

The conveyor unit includes a table section 3, which has a top member 4, which forms a part of the frame A. The conveyor unit also comprises a broad endless belt 5, having an upper stretch 6 which rests upon and moves along said top member 4 for conveying stones to be processed. Belt 5 is mounted on upper rollers 7 and lower rollers 8. The belt may have a tensioning device—not shown as it does not form a part of the present invention.

One of the upper pulleys 7 is a driven pulley which has a sprocket 9 connected to it, and this sprocket forms a part of a chain and sprocket connection 10 with a ratchet shaft 11. The ratchet shaft constitutes a part of the power transmission unit G and is mounted in suitable bearings such as those indicated at 12 and disposed transversely of the endless belt.

Keyed on the ratchet shaft 11 is a ratchet wheel 13 having one-way teeth co-acting with a pawl 14 which is held in engagement with the ratchet wheel as by spring pressure and carried by an oscillating yoke 15 journalled on the shaft 11 to straddle the ratchet wheel. The yoke 15 is connected pivotally to a pitman 16 which in turn is pivoted on a crank pin of a crank disc 17. The disc crank is rigid with an end of a shaft 18 journalled in bearings 19, which in turn are supported on a plate 20 forming a part of frame A. Shaft 18 is driven by a shaft 21 through meshing beveled gears 22. Shaft 21 constitutes a part of the lifter mechanism for the upper chisel as will be hereinafter dealt with.

From the foregoing, it will be understood that the described power transmission for the driven pulleys 7 operates this pulley with an intermittent motion in accordance with the stroke and angular rotation imparted to shaft 11 in each reciprocation of the pitman. Therefore, the belt is caused to move unidirectionally with a step-by-step motion and this intermittent motion serves to convey stones, such as that indicated at 23, along the table top 4 to bring them to a chipping station where they are processed and from which they are further conveyed and removed in faced condition.

At the inner side of the belt, there is provided a fence 24 upstanding from the top 4 of the table, and spaced from inner edge of the belt to provide a gap. This gap provides an opening to allow the lower chisel to operate on a stone when the stone is disposed in an overhead position.

To further support the broad belt and to cooperate therewith due to the opening supplied to accommodate the lower chisel, there is supplied an aligned pair of narrow endless belts indicated at 25, which are carried on pulleys, each with an upper stretch on a level with said upper stretch of broad belt 5. These narrow endless belts are terminated short of each other at the region of said lower chisel to provide an opening through which this chisel may have access to the stones as they are conveyed overhead thereof. The narrow belts are carried by the upper pulleys 7 respectively, and also by idler pulleys 26 at the inner ends of these belts. From this it will be seen that there is a suitable opening provided for the lower chisels to have access to the stone carried to the chipping station, and that the under face of the stone is exposed at its inner edge in order to allow the lower chisel to act on it. A gap for the lower chisel is indicated at 27 in Figs. 2 and 3.

In the use of the machine stones are placed longitudinally on the upper stretches of the broad and narrow belts in end to end relation, so that there will be a continuous feed of the stones, each to be faced at their inner sides indicated at 28. It will be understood that the stones constrained in one direction against lateral displacement by means of the upstanding fence 24. Desirably, there is provided a lateral pressure-wheel mechanism to hold stones against the fence. This mechanism comprises wheels 29 supported on the table section 5 and urged into contact with stones as by yieldable pressure. The wheels may be rubber-tired and are shown as individually supported by a crank 30 journalled on the table section as by a spindle 31 which is connected at its lower end to a spring device 32, whereby the wheel is pressed inwardly to bear on a stone. The spring device is shown as an arm fixed on the spindle having a tension spring which is made captive to the table section. It will be manifest that other spring devices may be used such as a spiral spring having its inner end fastened to the spindle and outer end connected to a relatively stationary element. Any number of the rubber-pressure wheels may be used such as the bank or longitudinal series depicted in Figure 1.

As has been mentioned earlier, the chipping mechanism is mounted on the frame A and includes upper and lower reciprocal chisels, the lower chisel being disposed below the table top and the overlying stretches of the belts, for acting on the lower sides of stones as they are transported by the conveyor. The upper chisel is denoted at 33 and the lower chisel is denoted at 34. The chisels have inner cutting edges and outer heads, the latter being denoted at 35. The upper chisel is mounted in a holder 36 for reciprocal movement and is limited in its movement as by approved means. The lower chisel is similarly mounted in a holder 37 and is likewise constrained to a limited reciprocal movement. The chisels may have adjustable blades and the blades are indicated at 38. The holders constrain the chisels at suitable angles for chipping opposite edge faces of stones and the holders are suitably supported on the frame.

A spring 39 is seated on each holder and on the chisel therein under tension in order to bias the chisels toward each other, and thereby provide for the chisels to be pressed lightly against adjacent faces of a stone as it is caused to travel to an interposed position between the chisels for which purpose the chisels are raised as will be explained later. Each chisel may be provided with a pair of springs one on each side thereof as shown in the drawings.

The actuating means for motivating the chisels comprises an upper hammer 40 and a lower hammer 41, each having a head 42 and a shank 43. The hammers are of identical construction and arrangement and each is pivotally supported on the frame A by means of their shanks, and have their heads disposed to strike the head of the chisels respectively. The shank of the upper hammer is pivoted at 44 to a bracket 45 attached to the plate 20 and likewise the lower hammer has its shank pivoted at 46 to a bracket 47 on a plate 48, which plate is attached to the uprights 1 of the frame.

The actuating means for the hammers comprises a separate mechanism for each and this includes spring means acting on the hammers respectively to produce striking force. The spring means is shown as taking the form of spiral springs indicated at 48. Each such spring has its inner end made rigid with the shank 43 of the respective hammer and its outer end made rigid with the supporting bracket, such as to tension the hammer when it is swung away from the respective chisel, as indicated in phantom lines, Fig. 3. Accordingly, it will be understood that when a hammer is swung away from the respective chisel and then suddenly released, it will be pressed forwardly in a working stroke to strike the head of the respective chisel with a blow of a magnitude sufficient to drive the chisel with a sharp, clear chipping action.

Said actuating means also includes a cam follower 49 radially extending from the shank of each hammer and co-acting with a quick-drop cam. The cam follower 49 belonging to the upper hammer cooperates with the quick-drop cam 50 which has radial rollers 51 disposed to engage the cam follower during rotation for swinging the hammer away from the corresponding chisel for abrupt release action. The quick-drop cam 50 is keyed or otherwise secured to a shaft 52 mounted in suitable bearings, such as those indicated at 53, and supported on the plate 20. Shaft 52 is horizontally arranged and connected to a reduction gear box 54 containing suitable reduction gears and which has a driving connection with an electric motor 55 by means of a belt and pulley connection denoted at 56.

From the foregoing, it will be manifest that the motor drives the transmission and power is taken off the same for driving the quick-drop cam so the interposed reduction gearing reduces the speed to a desirable R. P. M.

The quick-drop cam for the lower hammer 41 is denoted at 57 and the rollers for acting on the cam follower 49 are indicated at 58. This quick-drop cam is keyed on a shaft 59 journalled in bearings 60 which are fixed on the support 60 forming a part of the frame A. Shaft 59 is a chain and sprocket connection 61 with a stub shaft 62 journalled in bearing 63. This shaft is driven by shaft 52 through the medium of meshing spare gears 64 and is turned reversely so that quick-drop cam 57 will rotate in the proper direction for acting on the cam follower 49 of hammer 41.

Having described the hammer mechanism, the lifters and their actuating means will be recounted. The upper chisel 33 is supplied with a lifter 65, pivoted on a bracket 66 integral with, or secured to the plate 20 of the frame A. The lifter has a finger 67 for engaging an abutment 68 on the chisel so that when the lifter is swung in one direction, it will serve to raise the chisel from its extreme downward position to a raised position in which the cutting edge is clear of the top face of the stone, thus allowing the stone to advance in order to bring an unchipped portion directly under the chisel for a chipping operation. The pivotal axis of the lifter is indicated at 69 and the abutment face is indicated at 70. The means for operating the lifter 65 comprises a wiper cam 71 keyed or otherwise secured on shaft 21 for rotational movement in the operation of the machine. The wiper cam rotates at a given speed continuously while the machine is active. In its rotation it comes into engagement with the lifter 65 to bring about a swinging movement for effecting the raising of the chisel 33. The wiper cam disengages itself from the lifter to allow the chisel to descend in proper timed sequence with the movement of the belt mechanism, so that the cutting edge of the chisel comes to rest on an uncut portion of the stone due to the advancement of the stone in the progressional movement of the conveyor.

The lifter mechanism for the lower chisel 34 is of identical construction, and comprises the lifter 72 pivoted at 73 and having a finger 74, engageable with the abutment 75. The wiper cam is indicated at 76 and is keyed on a shaft 77. Shaft 77 is driven by a chain and sprocket indicated at 78 from the shaft 59 and this chain and sprocket drive, forms a part of the general transmission, previously recounted. It may be here remarked that the chisels are not directly opposed to each other, but are relatively offset in the longitudinal direction of the belts.

There is provided a vertical pressure-wheel mechanism including a wheel 79 preferably of the rubber type supported above the conveyor and overlying the lower chisel to take impacts thereof imparted to a stone in a chipping operation. The pressure-wheel 79 is shown as carried by a support bar 80, adjustable in a bracket 81 by means of a screw device 83, whereby its elevational disposition may be varied. Bracket 81 is attached, of course, to a part of the frame. Wheels 79 and 83 are disposed to ride on the stones as the latter are carried on the conveyor to be processed.

Preferably, there is provided an endless belt as at 84, for disposal of chips. This belt is mounted on rollers as indicated at 85 and is arranged transversely of the conveyor for the stones, and at a somewhat lower elevation than the table top 4, whereby chips may drop onto the upper stretch of the transverse belt, which travels in a direction to carry them away from the chisels so that they may be deposited in a receptacle, not shown, since it does not form a part of the invention. The disposal belt for the chips is powered by the transmission unit and to this end has a driving connection with shaft 77.

From the preceding description, it will be manifest that my invention provides a sturdy and serviceable machine for facing stones, and one which is reliable in operation. The machine has been found to be particularly efficient in actual practice. It is only necessary, of course, to place the stones to be processed, on the receiving end of the belt conveyor and to take them off at the delivery end. It will be manifest that such changes and modifications may be resorted to as fairly come within the scope of the appended claims.

What I claim is:

1. A stone facing machine comprising a frame, an intermittently driven conveyor unit for transporting stones with a step-by-step motion, upper and lower chisels, holders on said frame for said chisels and supporting them for reciprocal movements, said holders containing said chisels at suitable angles for chipping opposite edge faces of stones, said chisels having inner cutting edges and outer heads, upper and lower hammers operably mounted on said frame for striking the heads of said chisels, actuator means for said hammers, a power transmission unit for said actuator means, lifters mounted on said frame for raising the respective chisels after a chipping stroke, means for operating said lifters in timed sequence to said hammers, and a chip disposal belt dispersed transversely of said endless conveyor belt and operating to carry away chips.

2. A stone facing machine comprising a frame, an intermittently driven conveyor or unit for transporting stones with a step-by-step motion, upper and lower chisels, holders on said frame for said chisels and supporting them for reciprocal movements, said holders containing said chisels at suitable angles for chipping opposite edge faces of stones, said chisels having inner cutting edges and outer heads, upper and lower hammers operably mounted on said frame for striking the heads of said chisels, actuator means for said hammers, a power transmission unit for said actuator means, lifters mounted on said frame for raising the respective chisels after a chipping stroke, and means for operating said lifters in timed sequence with regard to the operation of said hammers.

3. A stone facing machine comprising a frame, an intermittently driven conveyor or unit for transporting stones with a step-by-step motion, upper and lower chisels, holders on said frame for said chisels and supporting them for reciprocal movements, said holders containing said chisels at suitable angles for chipping opposite edge faces of stones, said chisels having inner cutting edges and outer heads, upper and lower hammers operably mounted on said frame for striking the heads of said chisels, actuator means for said hammers, a power transmission unit for said actuator means, lifters mounted on said frame for raising the respective chisels clear of a chipped stone after a chipping stroke, rotary cam devices on said frame for actuating said lifters, and means for using said power transmission unit to power said rotary cam devices.

4. A stone facing machine comprising a frame, an intermittently driven conveyor or unit for transporting stones with a step-by-step motion and providing a gap whereby access may be had to edge faces of the stones at a chipping station, upper and lower chisels at said chipping station, holders on said frame for said chisels and supporting them for reciprocal movements, said holders containing said chisels at suitable angles for chipping opposite edge faces of stones, said chisels having inner cutting edges and outer heads, upper and lower hammers operably mounted on said frame for striking the heads of said chisels, actuator means for said hammers, a power transmission unit for said actuator means, lifters mounted on said frame and having elements for engaging abutments on said chisels to raise the respective chisels clear of a chipped stone after a chipping stroke so that each chisel may engage an unchipped portion when the stone is advanced, wiper cams rotatably mounted on said frame for operating said lifters respectively, each wiper cam having a camming face for swinging a lifter in a lifting operation and then releasing it, and means establishing a connection between said wiper cams and said power transmission unit for co-ordinated operation of said wiper cams.

5. A stone facing machine comprising a frame, an intermittently driven conveyor or unit for transporting stones with a step-by-step motion and providing a gap whereby access may be had to edge faces of the stones at a chipping station, upper and lower chisels at said chipping station, holders on said frame for said chisels and supporting them for reciprocal movements, said holders containing said chisels at suitable angles for chipping opposite edge faces of stones, asid chisels having inner cutting edges and outer heads, upper and lower hammers operably mounted on said frame for striking the heads of said chisels, actuator means for said hammers, a power transmission unit for said actuator means, lifters pivoted on said frame and having fingers for engaging abutments on said chisels to raise the respective chisels clear of a chipped stone after a chipping stroke so that each chisel may engage an unchipped portion when the stone is advanced, wiper cams rotatably mounted on said frame for operating said lifters respectively, each wiper cam having a camming face for swinging a lifter in a lifting operation and then releasing it, and means establishing a connection between said wiper cams and said power transmission unit for co-ordinated operation of said wiper cams.

6. A stone facing machine comprising a frame, an intermittently driven conveyor or unit for transporting stones with a step-by-step motion and providing a gap whereby access may be had to edge faces of the stones at a chipping station, upper and lower chisels at said chipping station, holders on said frame for said chisels and supporting them for reciprocal movements, said holders containing said chisels at suitable angles for chipping opposite edge faces of stones, said chisels having inner cutting edges and outer heads, upper and lower hammers swingably mounted on said frame and spring biased for striking the heads of the respective chisels in a chipping operation, actuator means for swinging said hammers to spring load them for power strokes, a power transmission unit for said actuator means, lifters pivoted on said frame and having fingers for engaging abutments on said chisels to raise the respective chisels clear of a chipped stone after a chipping stroke so that each chisel may engage an unchipped portion when the stone is advanced, wiper cams rotatably mounted on said frame for operating said lifters respectively, each wiper cam having a camming face for swinging a lifter in a lifting operation and then releasing it, and means establishing a connection between said wiper cams and said power transmission unit for co-ordinated operation of said wiper cams.

7. A stone facing machine comprising a frame, an intermittently driven conveyor or unit for transporting stones with a step-by-step motion and providing a gap whereby access may be had to edge faces of the stones at a chipping station, upper and lower chisels at said chipping station, holders on said frame for said chisels and supporting them for reciprocal movements, said holders containing said chisels at suitable angles for chipping opposite edge faces of stones, said chisels having inner cutting edges and outer heads, upper and lower hammers swingably mounted on said frame and spring biased for striking the heads of the respective chisels, quick-drop cam means for swinging said hammers to spring load them for power strokes, a power transmission unit for driving said quick-drop cam means, lifters pivoted on said frame and having fingers for engaging abutments on said chisels to raise the respective chisels clear of a chipped stone after a chipping stroke so that each chisel may engage an unchipped portion when the stone is advanced, wiper cams rotatably mounted on said frame for operating said lifters respectively, each wiper cam having a camming face for swinging a lifter in a lifting operation and then releasing it, and means establishing a connection between said wiper cams and said power transmission unit for co-ordinated operation of said wiper cams.

8. A stone facing machine comprising a frame, an intermittently driven conveyor or unit for transporting stones with a step-by-step motion and providing a gap whereby access may be had to edge faces of the stones at a chipping station, upper and lower chisels at said chipping station, holders on said frame for said chisels and supporting them for reciprocal movements, said holders containing said chisels at suitable angles for chipping opposite edge faces of stones, said chisels having inner cutting edges and outer heads, upper and lower hammers operably mounted on said frame for striking the heads of said chisels, cam operating means for said hammers, a power transmission unit for driving said cam operating means, spring means acting on said hammers respectively to produce striking force, lifters pivoted on said frame and having fingers for engaging abutments on said chisels to raise the respective chisels clear of a chipped stone after a chipping stroke so that each chisel may engage and unchipped portion when the stone is advanced, wiper cams rotatably mounted on said frame for operating said lifters respectively, each wiper cam having a camming face for swinging a lifter in a lifting operation and then releasing it, and means establishing a connection between said wiper cams and said power transmission unit for co-ordinated operation of said wiper cams.

9. A stone facing machine comprising a frame, an intermittently driven conveyor or unit for transporting stones with a step-by-step motion and providing a gap whereby access may be had to edge faces of the stones at a chipping station, upper and lower chisels at said chipping station, holders on said frame for said chisels and supporting them for reciprocal movements, said holders containing said chisels at suitable angles for chipping opposite edge faces of stones, said chisels having inner cutting edges and outer heads, upper and lower hammers each having a head and a shank, said hammers pivotally supported on said frame by means of their shanks and having their heads disposed to strike the heads of said chisels, quick-drop cams rotatably mounted on said frame and arranged to swing said hammers away from the respective chisels and abruptly release them, a power transmission unit connected to said quick-drop cams for co-ordinated operation thereof, spiral springs at the pivots of said hammers and acting on said shanks thereof to cause the hammers to forcibly strike said chisels respectively when released by said quick-drop cams, lifters pivoted on said frame and having fingers for engaging abutments on said chisels to raise the respective chisels clear of a chipped stone after a chipping stroke so that each chisel may engage an unchipped portion when the stone is advanced, wiper cams rotatably mounted on said frame for operating said lifters respectively, each wiper cam having a camming face for swinging a lifter in a lifting operation and then releasing it, and means establishing a connection between said wiper cams and said power transmission unit for co-ordinated operation of said wiper cams.

10. A stone facing machine comprising a frame, an intermittently driven conveyor or unit for transporting stones with a step-by-step motion and providing a gap whereby access may be had to edge faces of the stones at a chipping station, upper and lower chisels at said chipping station, holders on said frame for said chisels and supporting them for reciprocal movements, said holders containing said chisels at suitable angles for chipping opposite edge faces of stones, said chisels having inner cutting edges and outer heads, resilient means pressing said chisels toward each other, upper and lower hammers each having a head and a shank, said hammers pivotally supported on said frame by means of their shanks and having their heads disposed to strike the heads of said chisels, quick-drop cams rotatably mounted on said frame for operating said hammers respectively by swinging them away from the corresponding chisel for abrupt release, a power transmission unit connected to said quick-drop cams for co-ordinated operation thereof, spiral springs at the pivots of said hammers and acting on said shanks thereof to cause the hammers to forcibly strike said chisels respectively when released by said quick-drop cams, lifters pivoted on said frame and having fingers for engaging abutments on said chisels to raise the respective chisels clear of a chipped stone after a chipping stroke so that each chisel may engage an unchipped portion when the stone is advanced, wiper cams rotatably mounted on said frame for operating said lifters respectively, each wiper cam having a camming face for swinging a lifter in a lifting operation and then releasing it, and means establishing a connection between said wiper cams and said power transmission unit for co-ordinated operation of said wiper cams.

11. A stone facing machine comprising a frame, an intermittently driven conveyor or unit for transporting stones with a step-by-step motion and providing a gap whereby access may be had to edge faces of the stones at a chipping station, upper and lower chisels at said chipping station, holders on said frame for said chisels and supporting them for reciprocal movements, said holders containing said chisels at suitable angles for chipping opposite edge faces of stones, said chisels having inner cutting edges and outer heads, resilient means pressing said chisels toward each other, upper and lower hammers each having a head and a shank, said hammers pivotally supported on said frame by means of their shanks and having their heads disposed to strike the heads of said chisels, a cam follower radially extending from the shank of each hammer, quick-drop cams rotatably mounted on said frame for operating said hammers respectively by swinging them away from the corresponding chisel for abrupt release, a power transmission unit connected to said quick-drop cams for co-ordinated operation thereof, spiral springs at the pivots of said hammers and acting on said shanks thereof to cause the hammers to forcibly strike said chisels respectively when released by said quick-drop cams, lifters pivoted on said frame and having fingers for engaging abutments on said chisels to raise the respective chisels clear of a chipped stone after a chipping stroke so that each chisel may engage an unchipped portion when the stone is advanced, wiper cams rotatably mounted on said frame for operating said lifters respectively, each wiper cam having a camming face for swinging a lifter in a lifting operation and then releasing it, and means establishing a connection between said wiper cams and said power transmission unit for co-ordinated operation of said wiper cams.

12. A stone facing machine comprising a frame, an intermittently driven conveyor or unit for transporting stones with a step-by-step motion and providing a gap whereby access may be had to edge faces of the stones at a chipping station, upper and lower chisels at said chipping station, holders on said frame for said chisels and supporting them for reciprocal movements, said holders containing said chisels at suitable angles for chipping opposite edge faces of stones, said chisels having inner cutting edges and outer heads, springs supported on said holders and biasing said chisels toward each other, upper and lower hammers each having a head and a shank, said hammers pivotally supported on said frame by means of their shanks and having their heads disposed to strike the heads of said chisels respectively, a cam follower radially extending from the shank of each hammer, quick-drop cams rotatably mounted on said frame for operating said hammers respectively, each quick-drop cam having a radial roller disposed to engage a said cam follower during rotation for swinging the respective hammer away from the corresponding chisel for abrupt release action, a power transmission unit connected to said quick-drop cams for co-ordinated operation thereof, spiral springs at the pivots of said hammers and acting on said shanks thereof to cause the hammers to forcibly strike said chisels respectively when released by said quick-drop cams, lifters pivoted on said frame and having fingers for engaging abutments on said chisels to raise the respective chisels clear of a chipped stone after a chipping stroke so that each chisel may engage an unchipped portion when the stone is advanced, wiper cams rotatably mounted on said frame for operating said lifters respectively, each wiper cam having a camming face for swinging a lifter in a lifting operation and then releasing it, and means establishing a connection between said wiper cams and said power transmission unit for co-ordinated operation of said wiper cams.

13. A stone facing machine comprising a frame, an intermittently driven conveyor unit for transporting stones with a step-by-step motion and providing a gap whereby access may be had to edge faces of the stones at a chipping station, upper and lower chisels at said chipping station, holders on said frame for said chisels and supporting them for reciprocal movements, said holders containing said chisels at suitable angles for chipping opposite edge faces of stones, said chisels having inner cutting edges and outer heads, compression springs seated on said chisels and said holders and pressing said chisels toward each other to bring the cutting edges thereof into engagement with an interposed stone, upper and lower hammers each having a head and a shank, said hammers pivotally supported on said frame by means of their shanks and having their heads disposed to strike the heads of said chisels respectively, a cam follower radially extending from the shank of each hammer, quick-drop cams rotatably mounted on said frame for operating said hammers respectively, each quick-drop cam having a radial roller disposed to engage a said cam follower during rotation for swinging the respective hammer away from the corresponding chisel for abrupt release action, a power transmission unit connected to said quick-drop cams for co-ordinated operation thereof, spiral springs at the pivots of said hammers and acting on said shanks thereof to cause the hammers to forcibly strike said chisels respectively when released by said quick-drop cams, lifters pivoted on said frame and having fingers for engaging abutments on said chisels to raise the respective chisels clear of a chipped stone after a chipping stroke so that each chisel may engage an unchipped portion when the stone is advanced, wiper cams rotatably mounted on said frame for operating said lifters respectively, each wiper cam having a camming face for swinging a lifter in a lifting operation and then releasing it, and means establishing a connection between said wiper cams and said power transmission unit for co-ordinated operation of said wiper cams.

14. A stone facing machine comprising a frame including a table section having a top member, a broad endless belt, pulleys journalled on said table section and carrying said belt with an upper stretch thereof resting on and movable along said top member for conveying stones, a power drive for said belt, said power drive having a connection with one of said pulleys and including a ratchet device for moving said belt with a step-by-step motion, a fence upstanding from said table and spaced from a longitudinal edge of said belt to provide a gap, means for constraining stones on said belt against said fence so that they overlie said gap, a chipping mechanism mounted on said frame and including upper and lower reciprocal chisels, the lower chisel being disposed below said upper stretch of said belt for acting on the lower sides of stones as they are transported by said belt, an aligned pair of narrow endless belts, pulleys carrying said narrow endless belts each with an upper stretch in said gap and on a level with said upper stretch of said broad belt, said narrow endless belts terminated short of each other at the region of said lower chisel to provide an opening through which this chisel has access to the stones as they are conveyed overhead thereof, and driving means for said narrow endless belts for movement synchronously with said broad belt.

15. A stone facing machine comprising a frame including a table section having a top member, an endless conveyor belt, pulleys journalled on said table section and carrying said belt with a stretch thereof resting on and movable along said top member for conveying stones, a power drive for said belt including a ratchet device for causing said belt to move with a step-by-step motion, a fence upstanding from said table adjacent to a longitudinal edge of said belt to constrain the stones against lateral displacing movement in one direction, a lateral pressure-wheel mechanism including a wheel supported on said table section to yieldably hold the stones against said fence, a chipping mechanism mounted on said frame including an upper reciprocal chisel and a lower reciprocal chisel, said chisels being relatively offset with respect to the direction of travel of the stones, hammer means also included in said chipping mechanism for striking said chisels in chipping operations, and a vertical pressure-wheel mechanism including a wheel supported above said belt and overlying said lower chisel to take impacts thereof imparted to a stone in a chipping operation.

16. A stone facing mechanism as defined in claim 15, in which said wheel of said lateral pressure-wheel mechanism is supported by a crank journalled on said table section and in which said crank is influenced by spring pressure to press said wheel whereby to yieldably hold a stone against the fence.

17. A stone facing mechanism as defined in claim 15, in which the lateral pressure-wheel mechanism includes a longitudinal series of journalled wheels individually influenced by spring pressure.

18. A stone facing mechanism as defined in claim 15, in which the wheel of the vertical pressure-wheel mechanism is journalled in a bracket, and in which said bracket has a screw adjustment to take up wear.

19. A stone facing mechanism as defined in claim 15, in which said top member of said table section has an edge portion adjacent to said fence and spaced from said fence a distance sufficient to allow the lower chisel to operate on a stone when the stone is disposed in an overhead position, and in which said belt has an inner edge portion adjacent to said fence but spaced therefrom a distance sufficient to allow the lower chisel to operate on a stone when the stone is disposed in said overhead position.

References Cited in the file of this patent

UNITED STATES PATENTS

| | | |
|---|---|---|
| 551,563 | Strickler | Dec. 17, 1895 |
| 580,580 | Lovell | Apr. 13, 1897 |
| 647,057 | Weber | Apr. 10, 1900 |